United States Patent [19]

Chouinard

[11] 4,076,379
[45] Feb. 28, 1978

[54] FIBER OPTIC CONNECTOR

[75] Inventor: Rene Joseph Chouinard, Andover, Conn.

[73] Assignee: United Technologies Corporation, Hartford, Conn.

[21] Appl. No.: 708,679

[22] Filed: Jul. 26, 1976

[51] Int. Cl.² .................................... G02B 5/14
[52] U.S. Cl. ......................................... 350/96.22
[58] Field of Search ........................ 350/96 C, 96 R

[56] References Cited

U.S. PATENT DOCUMENTS

| 3,902,785 | 9/1975 | Matthews | 350/96 C |
|---|---|---|---|
| 3,917,383 | 11/1975 | Cook et al. | 350/96 C |
| 3,922,064 | 11/1975 | Clark et al. | 350/96 C |
| 3,923,371 | 12/1975 | Dalgleish | 350/96 C |
| 3,936,145 | 2/1976 | McCartney | 350/96 C |
| 3,969,015 | 7/1976 | LeNoane | 350/96 C |

OTHER PUBLICATIONS

Bloem et al. "Fiber-Optic Coupler" IBM Tech. Disc. Bull. vol. 16, No. 1, June 1973.

Primary Examiner—John K. Corbin
Assistant Examiner—Stewart Levy
Attorney, Agent, or Firm—Robert C. Walker

[57] ABSTRACT

A connector assembly which is adapted for use with fiber optic cable is disclosed. Techniques for aligning the corresponding light ways of a multiway cable and for minimizing the loss of light energy across the connector are developed. The connector illustrated includes a spacer disposed between the opposing ends of the corresponding light ways within the connector. The ends of the light ways are accessible for optical cleaning after repeated use to restore efficient light transmissive capabilities to the connector.

13 Claims, 1 Drawing Figure

FIBER OPTIC CONNECTOR

BACKGROUND OF THE INVENTION

1. Field of the Invention

This invention relates to fiber optic systems and more specifically to connectors for joining light ways in a fiber optic system.

2. Description of the Prior Art

Scientists and engineers in diverse technical fields are recognizing the utility and benefits of fiber optic systems for processing and transmitting intelligence in the form of light energy between remote locations. Cables connecting units of fiber optic equipment function comparably to electrical cables and require connectors for joining cable ends to equipment and for splicing cable ends at intermediate positions.

In comparison to the generally ductile fibers of electrically transmissive systems the fibers of optically transmissive systems are brittle and are highly susceptible to damage at the connection points. In further comparison the fibers of optically transmissive systems are highly sensitive to preferred alignment for efficient signal transmission. U.S. Pat. No. 3,904,269 to Lebduska et al entitled "Fiber Optic Cable Connector", U.S. Pat. No. 3,923,371 to Dalgleish entitled "Optical Fibre Connectors", U.S. Pat. No. 3,936,145 to McCartney entitled "Fiber Optic Alignment Sleeve" are considered to be representative of prior art teachings in the cable connector field.

One specific developing use for fiber optic systems is in conjunction with electronic controls for gas turbine engines. The electronic controls are employed to accurately regulate fuel flow to the combustors and augmentors of the engine and to regulate variable geometry devices such as vanes and nozzles within the engine. The electronic control units are mounted in engine locations which are subject to only minimal extremes of temperature, mechanical stress and electromagnetic interference. The sources of input data to the control unit, however, are necessarily in engine areas subject to harsh thermal environments, mechanical shock and vibration, and electromagnetic interference. The collection and transmission of this data from the source to the control unit by fiber optic systems offers a substantial improvement over prior used electrical systems.

The full potential of optical systems, however, is dependent upon the development of connectors which will provide accurate alignment and which will maintain acceptable light transfer efficiencies. Substantial efforts are being directed toward the development of improved fiber optic connectors which are suited not only for the harsh environments described above, but offer improved transmissive capabilities.

SUMMARY OF THE INVENTION

A primary aim of the present invention is to provide a cable connector for joining the optically transmissive ways of fiber optic systems. Improved efficiency of light transmission and reduced susceptibility to mechanical damage are sought. The direct alignment of a plurality of ways within a single connector without damage to the opposing fiber ends of the corresponding ways is a specific object in at least one embodiment.

According to the present invention the ends of the light ways in a fiber optic connector are held in axially spaced relationship by a spacer element disposed between the ends of the optical ways and the ways are aligned in optical communication by a pair of axially extending, alignment pins which are in engagement with the joined sections of the connector assembly.

One important feature of the present invention is the section plugs in which the fiber light ways are embedded. A polished surface on each plug is perpendicular to the axis of the connector and contains flush fiber ends of the light ways. A spacer is disposed between the opposing polished surfaces of the plugs. Two axially oriented alignment pins extend from the polished surface to one plug into engagement with the opposing plug. A potting compound engulfs the fiber ways which extend rearwardly from each plug.

A principal advantage of the present invention is improved alignment between the ends of the light ways of the connector sections. The connector is well suited to the multiway conduction of light energy through a plurality of ways. Spacing the opposing ends of the light ways prevents abrasion of the fiber ends and allows diffusion of light energy to a homogeneous pattern as presented to the fiber ends of the opposing way. The connector assembly has reduced susceptibility to structural damage during handling and is tolerant of vibratory and structural loads during use. The end surfaces of the plugs may be optically cleaned after repeated use to restore efficient light transmissive capabilities to the connector assembly.

The foregoing, and other objects, features and advantages of the present invention will become more apparent in the light of the following detailed description of the preferred embodiment thereof as shown in the accompanying drawing.

DESCRIPTION OF THE PREFERRED EMBODIMENT

Figure 1:
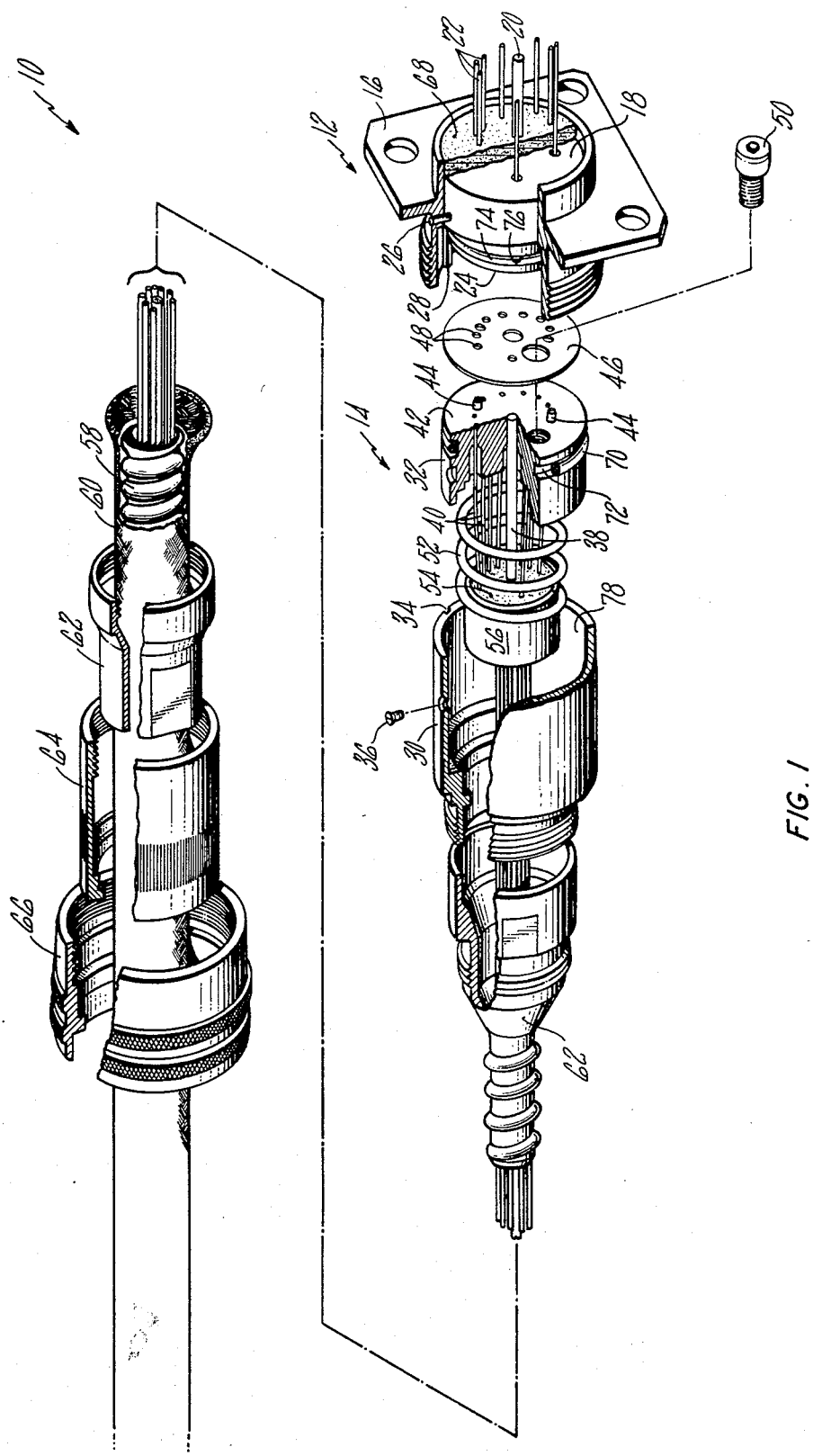
FIG. 1 is an exploded view of the connector assembly.

An exploded view of a connector assembly 10 for a fiber optic cable is shown in FIG. 1. The connector assembly shown is adapted for the transmission of light energy through a plurality of light ways or fiber optic bundles. The connector assembly comprises a panel section 12 and a cable section 14. The panel section is adapted for mounting on an intelligence processing device and includes a housing 16. A panel plug 18 is contained within the housing and is adapted to receive a plurality of the light ways. In the embodiment shown a central way 20 of relatively large diameter is positioned at the axis of the connector assembly. A plurality of circumferentially spaced ways 22 having smaller diameters are disposed about the central way. Each of the light ways extends axially through the panel plug and terminates at the end of the plug at a polished surface 24 which is perpendicular to the axis of the connector assembly. The panel plug 18 is held in circumferential alignment with the housing 16 by a radially extending, locator pin 26 which penetrates the housing and engages the panel plug. The housing further has an alignment key 28.

The cable section 14 principally includes a shell 30 and a cable plug 32. The shell has an alignment slot 34 which is engaged by the alignment key 28 of the housing 16. The cable plug is held in circumferential alignment with the shell 30 by a radially extending, locator pin 36 which penetrates the shell and engages the cable plug. The cable plug is adapted to receive a plurality of light ways or fiber optic bundles which are so oriented therein as to interface with the ways or bundles of the panel plug 18. In the embodiment shown a central way 38 of relatively large diameter is positioned at the axis of the connector assembly. A plurality of circumferentially spaced ways 40 having smaller diameters are disposed about the central way. The number of the ways 40 of the cable section corresponds to the number of the ways 22 of the panel section, and in the embodiment shown is eight. Each of the light ways extends axially through the cable plug and terminates at the end of the plug at a polished surface 42 which is perpendicular to the axis of the connector assembly. An axially oriented, alignment pin 44 extends from the cable plug into engagement with the panel plug to accurately align the ways 22 of the panel section with the ways 38 of the cable section. In one embodiment two of the alignment pins 44 are utilized to provide accurate location of the panel plug 18 with respect to the cable plug 32.

A spacer 46 is disposed between the polished surface 24 of the panel plug and the polished surface 42 of the cable plug. The spacer has a plurality of orifices 48 disposed therein to permit the transmission of light energy between the ways of the panel plug and the corresponding ways of the cable plug. In the embodiment shown the spacer is attached to the cable plug by a screw 50. The spacer is held in abutting contact with the polished surface 42 of the cable plug and the polished surface 24 of the panel plug by a resilient means 52 which is contained within the cable section. In the embodiment shown the resilient means is a coil spring.

The light ways of the cable section are embedded in a potting compound 54. A sleeve 56 is disposed radially inward of the spring means 52 to contain the potting compound. The light ways extending from the cable section of the connector assembly are jacketed by a teflon sleeve 58. The teflon sleeve is encased within a conduit 60 of metallic braid. The teflon jacket and metallic braid are engaged by a ferrule 62 which is attached to the shell 30 by a retaining nut 64. A coupling nut 66 engages the shell of the cable section to affix the cable section to the housing 16 of the panel section. The light ways of the panel section are similarly embedded in a potting compound 68 which is contained by the housing 16.

The connector assembly as shown is hermetically sealed at the cable section by an "O" ring 70 which is disposed within a groove 72 in the cable plug 32, and by an "O" ring 74 which is disposed within a groove 76 in the panel plug 18. Both the "O" ring 70 of the cable section and the "O" ring 74 of the panel section seat against the inner circumferential surface 78 of the shell 30.

The connector assembly described herein is specifically adapted for use with fiber optic devices requiring the transmission of light energy through a plurality of discrete ways or fiber optic bundles. In one contemplated use of the device shown a source signal is transmitted through the central way, processed in an encoding device, and returned in digitally encoded form through the plurality of circumferentially spaced ways. The central way in one embodiment has a diameter of sixty-six thousandths (0.066) of an inch and is comprised of approximately seven hundred twenty (720) individual fibers. In the same embodiment, each of the circumferentially spaced ways has a diameter of twenty-two thousandths (0.022) of an inch and is comprised of approximately ninety (90) individual fibers.

In one embodiment, the connector assembly is suited for use in high temperature environments up to approximately 500° F. One family of optical fibers suited to use in the 500° environment is comprised of a flint glass core with a borosilicate cladding. The cladding material has a lower index of refraction than the core material. These fibers are known as high loss fibers and have a relatively high numerical aperture of approximately sixty-six hundredths (0.66) or greater. The flint glass core fibers with a borosilicate cladding are used with instrumentation in gas turbine engines because of the light gathering properties associated with the relatively high numerical aperture. Those skilled in the art, however, will recognize that the connector concepts described herein are suitable for use with other fiber systems in differing environments, and for differing purposes.

The light ways of the cable plug and of the panel plug terminate at the polished surface of the cable plug and panel plug respectively. In the manufacture of the connector assembly, the fibers are inserted in the respective plugs so as to extend outwardly from the polished surface. The fibers are then ground and polished in their respective plugs so that the terminal ends of the ways are flush with the polished surface. The ends of the respective plugs may be subsequently cleaned and polished after use to restore the efficient light transfer capabilities between the ways of the cable plug and the ways of the panel plug which are provided by this connector.

The spacer 46 is disposed between the polished surface 24 of the panel plug and the polished surface 42 of the cable plug to prevent abrasion or fretting of the fiber ends. Orifices 48 in the spacer are provided in alignment with the light ways to enable the transmission of light energy through the spacer. The orifices have a larger diameter than the respective ways with which they are aligned. In the connected assembly, the ends of the ways are free of contact with any opposing structure. In one embodiment it has been found that a spacer having a thickness of three thousandths (0.003) of an inch to eight thousandths (0.008) of an inch provides acceptable spacing between the ends of the ways. Empirical evaluations have revealed that a spacer of four thousandths (0.004) of an inch provides an embodiment having optimized light transmission capabilities. Surprisingly, this connector having an axial space between the ends of the corresponding light ways shows improved transmissive capabilities over embodiments having directly abutting ways. The improved transmissive capabilities of embodiments having a spaced relationship between the ways of the panel section and the ways of the cable section are attributed to limited diffusion of the light energy across the spacer. The limited diffusion provides homogeneity in the light pattern presented to the opposing way. The otherwise deleterious effect of unavoidable misalignment between the multiplicity of individual fibers comprising the opposing ways is mitigated.

The ways of the cable plug and the ways of the panel plug are aligned as the panel section and cable section are assembled. Initial engagement between the panel section and the cable section occurs as the alignment key 28 of the panel section slides into the alignment slot 34 of the cable section. As the sections are brought into further engagement the alignment pins 44 orient the respective ways of the cable plug and the panel plug in optical communication. In the embodiment shown a circumferential alignment with one thousandth (0.001) of an inch or less is typical.

Each of the light ways is adhered to its respective plug by an epoxy compound. The compound must have a viscosity which is relatively low so as to enable the epoxy material to wick between the multiplicity of individual fibers comprising each light way. Additionally the optimum epoxy material when cured is compatible with the glass fibers, and has physical properties which resist lateral smearing onto the end surfaces of the light ways during polishing of the surfaces 24 and 42.

The potting compound in which the fiber ways are embedded is sufficiently flexible so as to accommodate limited angular deflection of the ways during handling of the connector but sufficiently supportive of the ways so as to prevent damage to the fibers.

The polished surface of the panel plug and the polished surface of the cable plug are held in parallel relationship by the spring means 52 which urges the polished surfaces into abutting relationship with the spacer 46.

The connector assembly shown is specifically adapted for mounting on an intelligence processing device. The connector, however, is equally useful in connecting cable sections. In a cable connecting embodiment, the housing 16 is adapted for attachment to a teflon jacket and a braided conduit in a manner comparable to that illustrated and described for the cable section.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the U.S. is:

1. A connector assembly for optically joining a pair of opposing light ways in a fiber optic system, which includes:
    a first plug having a polished surface oriented perpendicular to the axis of the connector assembly;
    a first light way having an end which is flushly embedded in the polished surface of said first plug;
    a second plug having a polished surface which is oriented perpendicularly to the axis of the connector assembly and which faces the polished surface of said first plug;
    a second light way having an end which is flushly embedded in the polished surface of said second plug;
    a pair of alignment pins which extend perpendicularly from said polished surface of the second plug into engagement with said first plug wherein at engagement the light way of the first plug is aligned with the light way of the second plug; and
    a flat spacer element disposed between said polished surface of the first plug and said polished surface of the second plug the spacer having a plurality of orifices which are located to axially separate the ends of the light ways.

2. The invention according to claim 1 which includes a plurality of said light ways.

3. The invention according to claim 2 which has a central way of relatively large diameter disposed at the axis of the connector assembly and a plurality of circumferentially spaced ways which are positioned radially outward of said central way.

4. The invention according to claim 1 wherein said spacer is a disk shaped element having an orifice in axial alignment with the light ways and wherein said orifice is of greater diameter than the diameter of the light ways.

5. The invention according to claim 4 wherein said spacer has a thickness within the range of three thousandths (0.003) of an inch to eight thousandths (0.008) of an inch.

6. The invention according to claim 5 wherein said spacer has a thickness of four thousandths (0.004) of an inch.

7. The invention according to claim 6 wherein said first plug is a cylindrically shaped element having a circumferentially extending, outwardly facing groove and wherein said second plug is a cylindrically shaped element having a circumferentially extending, outwardly facing groove and wherein said connector assembly further includes:
    a first "O" ring disposed in the groove of said first plug;
    a second "O" ring disposed within the groove of said second plug; and
    a cylindrical shell which has an inwardly facing cylindrical surface contacting said first and second "O" rings to hermetically seal the cavity defined by the polished surface of the first plug and the polished surface of the second plug.

8. The invention according to claim 6 wherein said spacer is affixed to said first plug.

9. The invention according to claim 8 which further includes resilient means disposed within said connector assembly in operative relationship to said first and second plugs so as to urge the polished surface of said first plug and the polished surface of said second plug into abutting relationship with said spacer.

10. For a fiber optic system, a cable connector including:
    a first section comprising
        a housing having an inwardly facing cylindrical surface and having an axially oriented alignment key extending radially inwardly from the surface,
        a first plug which is contained within said housing and which has at one end thereof a polished surface perpendicularly oriented with respect to the axis of the connector,
        a central way comprising a multiplicity of individual fibers which terminate flushly at the polished surface of said plug,
        a plurality of spaced ways each comprising a multiplicity of individual fibers which terminate flushly at the polished surface of said plug, and
        a radially extending, first locator pin which penetrates said housing to engage said first plug thereby preventing relative rotation between said first plug and the housing;
    a second section comprising
        a shell having an outwardly facing cylindrical surface, a portion of which opposes the inwardly facing surface of said housing, an inwardly facing cylindrical surface, and an axially oriented alignment slot which is engaged by the alignment key of said housing,
        a second plug which is contained within said shell and which has at one end thereof a polished surface perpendicularly oriented with respect to the axis of the connector and in opposing spaced relationship to said polished surface of said first plug, a central way comprising a multiplicity of individual fibers which terminate flushly at the polished surface of said second plug, the central way being in optical alignment with said central way of said first section, a plurality of spaced ways each comprising a multiplicity of individual fibers which terminate flushly at the polished surface of said second plug, the spaced ways being in optical alignment with the said spaced ways of said first section;

a radially oriented, second locator pin which penetrates said shell to engage said second plug thereby preventing relative rotation between said second plug and the shell;

a disk shaped spacer which is disposed between said polished surface of the first section and said polished surface of the second section, the spacer having incorporated therein a plurality of orifices which are located in axial alignment with the opposing ways of the first and second sections;

a pair of alignment pins which extend axially through said spacer and into engagement with said first plug and with said second plug to secure the corresponding ways in accurate alignment; and a coupling nut which engages the shell of the second section and affixes said shell to the housing of the first section.

11. The invention according to claim 10 which further includes resilient means disposed in operative relationship with respect to said first and second plugs to urge said polished surface of the first plug and said polished surface of the second plug into abutting relationship with the spacer.

12. The invention according to claim 11 which further includes sealing means disposed between said first plug and said shell and sealing means disposed between said second plug and said shell to hermetically seal the space contained between the polished surfaces of the plugs.

13. The invention according to claim 12 wherein each of said sealing means comprises an "O" ring in sealing contact with the inwardly facing circumferential surface of the shell and the respective plug.

* * * * *